United States Patent [19]

Koebisu et al.

[11] Patent Number: 4,663,362

[45] Date of Patent: May 5, 1987

[54] EXPANDABLE POLYVINYL CHLORIDE RESIN COMPOSITION AND FOAMED SHEET PREPARED FROM THE SAME

[75] Inventors: Mamoru Koebisu, Moriyama; Takeshi Nishioka; Nario Kamijyukkoku, both of Otsu; Hirosi Kawano, Kusatsu, all of Japan

[73] Assignee: Toray Industries, Inc., Tokyo, Japan

[21] Appl. No.: 888,594

[22] Filed: Jul. 23, 1986

[30] Foreign Application Priority Data

Aug. 12, 1985 [JP] Japan ................................ 60-175751

[51] Int. Cl.[4] .............................................. C08J 9/10
[52] U.S. Cl. ..................................... 521/134; 521/81; 521/145
[58] Field of Search ......................... 521/134, 81, 145

[56] References Cited

U.S. PATENT DOCUMENTS 3,975,315  8/1976  Parks .................................. 521/134
4,025,465  5/1977  Dorrn et al. ........................ 521/134
4,427,795  1/1984  Dorrestijn et al. ................. 521/134

*Primary Examiner*—Morton Foelak
*Attorney, Agent, or Firm*—Armstrong, Nikaido, Marmelstein & Kubovcik

[57] ABSTRACT

A crosslinked polyvinyl chloride resin composition comprising:

A: a polyvinyl chloride resin,
B: at least one copolymer selected from the group consisting of ethylene/acrylic acid copolymers, ethylene/alkyl acrylate copolymers and ethylene/alkyl methacrylate copolymers, and
C: a polyolefin resin and having a high expansion ratio, and a foam sheet prepared from the composition.

8 Claims, No Drawings

EXPANDABLE POLYVINYL CHLORIDE RESIN COMPOSITION AND FOAMED SHEET PREPARED FROM THE SAME

BACKGROUND OF THE INVENTION

The present invention relates to a crosslinked polyvinyl chloride resin foam having a high expansion ratio and excellent vacuum formability, flexibility, compression recovery, thermal resistance and hot adhesion, particularly high-frequency sealability and free from bleeding out of a plasticizer.

As is well known, polyvinyl chloride foams have been used widely in the production of automobile trims and furniture in virtue of their excellent flame retardancy and mechanical properties. However, the production of polyvinyl chloride resin foams having a high expansion ratio and excellent thermal resistance, flexibility and formability has technical difficulties in crosslinking and plasticizing the polyvinyl chloride foam. More particularly, crosslinking is necessary in the production of a polyvinyl chloride foam having a high expansion ratio with a decomposable blowing agent because the melt viscosity of the polymer must be increased to one suitable for forming a gas. It is believed that a reason why the expansion ratio of non-crosslinked polyvinyl chloride foams is as low as 2 to 3 is that the melt viscosity of the polymer is drastically lowered in the foaming step to make the retention of the original shape of the sheet impossible and a gas generated from the decomposed blowing agent is released from the sheet surface.

A process which comprises kneading polyvinyl chloride with a polyisocyanate, a blowing agent, an unsaturated acid anhydride, a polymerizable monomer and a halogenated saturated hydrocarbon, filling the obtained mixture in a pressure mold, heating and compressing the same with a press to effect gelation of the polymer and decomposition of the blowing agent, and heating the product again with hot water or steam to form a foam has been disclosed in the specifications of Japanese patent publications Nos.39-223370 and 41-12632. However, this process can be carried out only in batches and, therefore, its productivity is low and the cost of the foam is high. Further, when the crosslinking and foaming are effected under atmospheric pressure, the flowing agent is decomposed before the crosslinking reaction proceeds and, as a result, a gas generated thereby cannot be incorporated as foams into the molten polymer but released from the reaction system to make the production of a foam of a high expansion ratio impossible. Thus the conditions of this process are limited, namely, the crosslinking is effected by heating under pressure while the foaming is effected by heating under ambient pressure.

A process for producing crosslinked polyvinyl chloride resin foam by irradiation with electron beams is disclosed in the specifications of Japanese patent publications Nos. 46-18620 and 48-4863 and Japanese patent application Kokai (=laying-open) publication No. 48-1729. However, this process wherein electron beams are employed has defects that hydrochloric acid is formed by the decomposition of the polyvinyl chloride resin, which is competitive with the crosslinking reaction, that the obtained foam is colored with hydrochloric acid thus formed, and that the color is darkened from brown to black as the energy of irradiation is increased. In addition, the practical properties such as vacuum formability, thermal resistance, cold resistance (low temperature characteristic), hot adhesion and compression recovery of the foam crosslinked by irradiation with electron beams are unsatisfactory yet.

When these polyvinyl chloride resins are molded into a continuous sheet and the sheet is crosslinked and foamed under atmospheric pressure to form a foamed sheet, it is necessary to carry out melting and kneading under such conditions that the blowing agent will not be decomposed and then form a continuous sheet by extrusion or calendering. Since, however, the vinyl chloride resin usually contains a large amount of a plasticizer such as dioctyl phthalate, dibutyl phthalate, dioctyl adipate or epoxidized soybean oil, the plasticizer causes bleeding to a large extent and deposits on the sheet surface in the sheet-forming or foaming step. As a result, the properties of the obtained foamed sheet will change with time, the thermal resistance and adaptability to lamination thereof are deteriorated and sanitary troubles are caused.

SUMMARY OF THE INVENTION

An object of the present invention is to provide a crosslinked polyvinyl chloride resin foam having a high expansion ratio and excellent vacuum formability, thermal resistance, compression recovery and flexibility. Another object of the invention is to provide a crosslinked polyvinyl chloride resin foam free from defects due to the bleeding of a plasticizer and having stable properties which will not change with time and particularly an excellent thermal adhesiveness such as high-frequency sealability.

The above-mentioned objects of the present invention can be attained by an expandable polyvinyl chloride resin composition comprising as indispensable components:

A: a polyvinyl chloride resin,
B: at least one copolymer selected from the group consisting of ethylene/acrylic acid copolymers, ethylene/alkyl acrylate copolymers and ethylene/alkyl methacrylate copolymers, and
C: a polyolefin resin.

DETAILED DESCRIPTION OF THE INVENTION

The resin component A used as an indispensable component in the present invention includes various known polyvinyl chloride resins, preferably polymers comprising at least 65 wt. % of a vinyl chloride component. Examples of the resin component A include vinyl chloride homopolymer; copolymers of vinyl chloride with copolymerizable components such as vinyl esters, e.g. vinyl acetate and vinyl propionate, olefins, e.g. ethylene, propylene and styrene, vinyl ethers, e.g. stearyl vinyl ether and vinyl ethyl ether, 2-hydroxyethyl acrylate, 3-hydroxybutyl acrylate, acrylic acid, methacrylic acid, maleic acid and their alkyl esters; as well as graft copolymers of vinyl chloride obtained by graft-polymerizing ethylene/vinyl acetate copolymer or ethylene/acrylic ester copolymer with a vinyl chloride monomer. These polymers can be obtained by suspension polymerization, emulsion polymerization or known other processes.

The resin component A has an average degree of polymerization of 300 to 3,000, preferably 600 to 2,000.

The resin component B used as another indispensable component in the present invention is at least one copolymer selected from the group consisting of ethylene/acrylic acid copolymers, ethylene/alkyl acrylate copolymers and ethylene/alkyl methacrylate copolymers. The resin component B may be used either alone or in the form of a mixture of two or more of them.

Examples of the resin component B include ethylene/methyl acrylate copolymer, ethylene/ethyl acrylate copolymer (EEA), ethylene/butyl acrylate copolymer, ethylene/acrylic acid copolymer (EAA), ethylene/methyl methacrylate copolymer (EMMA) and ethylene/methyl methacrylate/maleic anhydride terpolymer (EMMA.MAH).

Now, the detailed description will be made with reference to ethylene/alkyl acrylate copolymer which is a typical example of the resin component B.

The ethylene/alkyl acrylate copolymer contains 10 to 35 wt. % of the alkyl acrylate as the comonomer and has a melting point (Tm) of 86 to 102° C. The melting point (Tm) is detected and measured with a differential scanning calorimeter (DSC). Though the alkyl group is not particularly limited, it is preferably a lower alkyl group having 1 to 10 carbon atoms, particularly an ethyl group from the viewpoint of sheet formation.

Though the polymerization process for the production of the ethylene/alkyl acrylate copolymer is not particularly limited, a process wherein a high conversion into the polymer can be attained, such as a process wherein ethylene and an alkyl acrylate are fed through one end of a tubular reactor and the product is taken out through the other end thereof while the concentrations of the monomers introduced and the polymerization catalyst are varied to effect continuous polymerization is preferred.

When the alkyl acrylate content of the copolymer is less than 10 wt. %, the plasticizing effect for the foam is poor and the temperature of the resin composition is elevated excessively to cause decomposition of the blowing agent in the extrusion step unfavorably, though the crystallinity is increased and the melting point (Tm) of the polymer is elevated so that a high thermal resistance can be obtained. On the contrary, when the alkyl acrylate content of the copolymer exceeds 35 wt. %, the amorphousness of the copolymer becomes excessive and, therefore, the rubber elasticity of the crosslinked foam becomes excessive to make the production of the foam having a high expansion ratio difficult.

When the resin component B is the abovementioned EEA, EMMA, EMMA.MAH or the like, it is desirable that the amount thereof in the copolymer is in the range of 10 to 35 wt. % and the melting point (Tm) thereof is in the range of 86° to 102° C. When the amount of the component B is controlled within the above-mentioned range, the obtained resin composition has a suitable melt viscosity and can be molded into a sheet easily without causing decomposition of the blowing agent, thus yielding a foam having a high expansion ratio. When the melting point (Tm) of the component B of the resin is lower than 86° C., the composition adheres to a roll in the course of the sheet formation and the obtained foam has a low thermal resistance. When the melting point (Tm) exceeds 102° C., the resin composition has a high melt viscosity and the blowing agent is decomposed by shearing and heat generation in the sheet-forming step unfavorably even though the thermal resistance is approvable.

When using polyethylene as the polyolefin resin C in the present invention, it has preferably a melting point (Tm) of lower than 115° C. and a viscosity of up to 0.935 g/cm². When using polypropylene as the component C, it is preferably a homopolymer or a random copolymer thereof with ethylene in an amount in the range of 2 to 8 wt. % and having a melt flow rate of 0.5 to 10 g/10 min and an infrared absorbance ratio (hereinafter referred to as IR absorbance ratio) ($I_{730}/I_{840}$) or ($I_{720}/I_{840}$) of 0.02 to 0.3. Examples of them include preferably propylene/α-olefin copolymers or propylene/ethylene/α-olefin copolymers containing at least 50 wt. % of propylene component.

The amounts of the above-mentioned resin components A, B and C are such that the weight ratio of (A+B)/C is at least 1.0, preferably at least 1.5. When this ratio is less than 1.0, the crystallinity of the resin composition constituting the foam is too high and the resulting foam has only a poor flexibility unfavorably.

The resin composition comprising the resin components A, B and C has an integrated intensity ratio (R) of the following formula in $^{13}$C-NMR spectrum, i.e. the ratio R of the vinyl chloride component to the unsaturated carboxylic acid component in the polymer constituting the foam of 2.0 to 45, preferably 8 to 35:

$$R = I_{56}/I_{179}$$

The value of R represented by the above-mentioned formula is a measure of the ratio of the polyvinyl chloride component to the total of the components (excluding the polyvinyl chloride component) of the resin composition constituting the foam, such as ethylene and unsaturated carboxylic acid components. When R is controlled in the above-mentioned range, the compatibility of the polymers contained in the resin composition with one another is improved and, in addition, melt kneadability, metal extrudability and crosslinkability of the composition are optimized.

Now, description will be made on an embodiment of the process for the production of the expandable polyvinyl chloride resin composition of the present invention.

The indispensable components, i.e. polyvinyl chloride resin component A, resin component B and resin component C are mixed together in the above-mentioned ratio and the following additives are incorporated into the mixture: a known thermal stabilizer such as a compound of a metal such as barium or tin, or an epoxy compound, a known thermally decomposable blowing agent such as azodicarbonamide, a sulfonyl hydrazide, e.g. p,p'-oxybisbenzenesulfonyl hydrazide, a sulfonylsemicarbazides, e.g. p-toluenesulfonyl semicarbazide, or a dinitrosomethyleneamine compound, e.g., N,N'-dinitrosopentamethylenetetramine; and, if necessary, a crosslinking agent which generates a radical by heating, preferably a polyfunctional monomer having at least two vinyl groups, e.g. divinylbenzene, triacrylformal, trimethylpropane triacrylate or triallyl trimelitate. The obtained mixture is shaped into a sheet while it is kept at such a temperature that the crosslinking agent and the blowing agent are not decomposed. The obtained sheet is crosslinked to obtain a gel fraction of 15 to 60%, preferably 20 to 40%, by a known method such as an ionizing radiation crosslinking method or a chemical crosslinking method.

When the gel fraction is less than 15%, the decomposition gas is released from the foam in the foaming step and, in an extreme case, no foam having an intended expansion ratio can be obtained. On the contrary, when the gel fraction is higher than 60%, the crosslinking becomes remarkable and the decomposition gas cannot be enclosed in the cells and, consequently, an ununiform, coarse cells are formed unfavorably.

In the ionizing radiation crosslinking process, ($\alpha$, $\beta$, $\gamma$ or X rays, electron beams or neutron rays are employed. Usually, for example, 1 to 50 Mrad of electron beams are applied to the sheet with a high-energy electron irradiating machine to effect the crosslinking. In this process, 0.1 to 10 parts by weight of a crosslinking assistant such as divinylbenzene, allyl phthalate or trimethylolpropane triacrylate may be added to the resin composition of the present invention in the electron beam crosslinking step.

The crosslinking can be effected by irradiation with U.V. rays, in place of the radiation rays, in the presence of an U.V. sensitizer such as benzophenone.

The chemical crosslinking can be effected by a process wherein an organic peroxide such as dicumyl peroxide or di-tert-butyl peroxide is used, or a silane crosslinking process wherein a vinylsilane such as vinyltrimethoxysilane is kneaded with the starting materials together with said crosslinking agent to effect the graft polymerization and the product is crosslinked according to a siloxane condensation reaction.

The crosslinked molding thus obtained is heated in a hot air atmosphere or on a salt bath to decompose the blowing agent contained in the obtained molding rapidly to thereby form a foam having an expansion ratio of 5 to 50, preferably 10 to 40. When the expansion ratio is lower than 5, the cushioning quality and resilience of the foam are insufficient and, on the contrary, when it exceeds 50, cell membranes in the foam becomes thin to reduce the toughness of the foam unfavorably.

The resin composition may contain various polymers such as ethylene/vinyl acetate/carbon monoxide copolymer, polybutene, ethylene/vinyl acetate copolymer and chlorinated polyethylene in an amount of as small as up to 10 wt. % so far as the object of the present invention is not damaged. Further, the resin composition may contain, if necessary, other additives such as a lubricant, antioxidant, U.V. absorber, coloring agent, antistatic agent, flame retardant and various inorganic substances for imparting other properties thereto so far as the object of the present invention is not damaged.

At least one surface of the sheet prepared from the expandable polyvinyl chloride resin composition of the present invention can be subjected to corona discharge treatment to improve its processability or an adhesive can be applied thereto by, for example, coating and another sheet such as a plastic film or a metal foil can be applied thereto to form a laminate.

The expansion ratio of the obtained polyvinyl chloride resin foam of the present invention ranges widely from that of as low as 5 to that of as high as 50. The foam has excellent flexibility, compression recovery, thermal resistance and vacuum formability. More particularly, the thermal resistance of this foam is so high that the coefficient of contraction thereof after heating to 80° C. for 22 hours is as low as up to 3%, and the vacuum formability thereof is such that the draw ratio of the molding [depth (L) / diameter (D)] is at least 0.5. In virtue of these properties, the foam can be used as a starting material for automobile trims, packings, adhesive tapes, mats, heat insulating materials and cushioning materials. Particularly, the foam can be used further in the production of clothes, building materials and medical supplies in virtue of its excellent flexibility.

In addition, the product of the present invention has an excellent thermal adhesiveness to polyolefin sheets such as polyethylene and polypropylene sheets, other polyvinyl chloride sheets and foamed sheets. The product has a particularly excellent high-frequency seal ability. The products produced from the composition of the present invention has advantages that the moldings produced from them are free from bleeding of the plasticizer and, therefore, their physical properties are not changed with time and the qualities and properties thereof are stable.

The polyvinyl chloride resin foam of the present invention can dispense with the use of a plasticizer as an indispensable component and it does not always require the use of a crosslinking assistant, so that the crosslinking and foaming can be effected under atmospheric pressure in the extrusion of the resin composition. As a result, a foam having a high expansion ratio and excellent flexibility and thermal resistance and comprising closed cells having a uniform cell size can be obtained.

The following examples will further illustrate the effects of the present invention.

In the above description and the following examples, the melting point (Tm), integrated intensity ratio (R) determined according to $^{13}$C-NMR spectrum, index of flexibility (N), thermal resistance, gel fraction, compression permanent set (S) and apparent expansion ratio were determined by the following measurement methods:

(1) melting point (Tm):

A sample was molten, recrystallized and again molten and an endothermic peak temperature determined with a DSC-2 differential scanning calorimeter (DSC) (a product of Perkin-Elmer Corporation) was employed as the melting point (Tm).

(2) Integrated intensity ratio (R) determined according to $^{13}$C-NMR spectrum:

In an integration curve of a $^{13}$C-NMR spectrum, an integrated intensity in the range of 53 to 59 ppm was represented as $I_{56}$ and that in the range of 173 to 185 ppm was represented as $I_{179}$. The integrated intensity ratio (R) of them was defined as follows:

$$R = I_{56}/I_{179}$$

The $^{13}$C-NMR spectrum was measured herein by the following method.

A solid sample concentration in a solvent mixture of o-dichlorobenzene (1.4 cc) and deuterated benzene (0.2 cc) was adjusted to 20 wt. % in an NMR sample tube having a diameter of 10 mm. $^{13}$C-NMR of the sample was determined by the pulse FT method at 120° C. with JNM-FX 100 device (a product of JEOL, Ltd.) (frequency: 25.00 MHz).

(3) Index of flexibility (N):

The index of flexibility was defined by the following formula:

$$N = (25\% \text{ compression strength}) \times (\text{expansion ratio})$$

The 25% compression strength was determined by a method as stipulated in JIS K6767-1976. The expansion ratio was represented by a reciprocal number of an apparent density of the foam.

According to the present invention, a sample having an index of flexibility of up to 20 ($N \leq 20$) stood the test.

(4) Thermal resistance:

A sample was heat-treated according to a method as stipulated in JIS K6767 and the thermal resistance was represented by the coefficients of heat shrinkages in the directions of length, breadth and thickness. In practice, a 10 cm × 10 cm square was marked on a sample (foam) and the thickness of the sample was measured. The sample was heat-treated in a hot air oven at 80° C. for 22 h. After cooling to room temperature, the length, breadth and thickness of the sample were measured. The thermal resistance was judged from the dimensional change by the heat treatment (heat shrinkage) as follows:

heat shrinkage $\leq \pm 3.0$: o [good]

$= 3.0$ to $5.0$: $\Delta$ [almost good]

$> \pm 5.0$: x [bad]

The dimensional change by the heat treatment was the average of the results of 5 to 10 tests.

(5) Gel fraction:
About 0.2 g of a finely divided foam was taken and weighed accurately. The result was referred to as $W_1$. This sample was immersed in tetralin at 135° C. for 3 h. An insoluble matter thus obtained was taken, washed with methanol, dried with air, dried in vacuum and immersed in 20 ml of dimethylformamide at 110° C. for 2 h. A remaining insoluble matter was taken, washed with methanol, dried with air and then in vacuum and weighed accurately. The weight was referred to as $W_2$.

The gel fraction was calculated according to the following equation:

Gel fraction (%) = $100 \times (W_2/W_1)$.

(6) Compression permanent set (S):
The compression permanent set was determined according to a method as stipulated in JIS K6767-1976. Pieces of a sample having a size of 5 cm × 5 cm were superposed to form a laminate having a thickness of about 25 mm. The laminate was left to stand for 22 h while a compression strain of 25% of the total thickness (t) was applied thereto. Then, the sample was released from the compression strain and left to stand at room temperature for 24 h and its thickness ($t_1$) was measured. The compression permanent set (S) was calculated according to the following equation:

S (%) = $100 \times (t - t_1)/t$.

(7) Expansion ratio:
The expansion ratio was represented by a reciprocal number of an apparent density of the foam. Namely, the foam was cut into 10 cm × 10 cm squares and the weight and thickness of the pieces were measured. The weight was divided by the volume. The expansion ratio was represented by a reciprocal number of the weight per unit volume (g/cm$^3$).

EXAMPLES 1 TO 5 AND COMPARATIVE EXAMPLES 1 to 4

Polyvinyl chloride resin grafted with acrylic acid was used as the resin component A in all examples except Example 3 in which unplasticized polyvinyl chloride resin was used. As the resin component B, a copolymer of ethylene with 5 to 30 wt. % of comonomer(s) such as ethylene/ethyl acrylate copolymer (EEA), ethylene/acrylic acid copolymer (EAA), or ethylene/methyl methacrylate/maleic anhydride terpolymer (EMMA.MAH) was used. A low-density polyethylene having a density of 0.921, a melting point (Tm) of 108° C. and a melt flow rate (MI) of 4.8 g/10 min was used as the resin component C. The amounts of the resin components A, B and C in the resin composition are shown in Table 1.

10 parts by weight of azodicarbonamide as the blowing agent, 2 parts by weight of basic lead sulfite as the thermal stabilizer and 0.5 part by weight of calcium stearate were added to 100 parts by weight of the above-mentioned resin composition and mixed in a Henschel mixer to obtain a dispersion, which was melt-extruded to form a sheet. The sheet was irradiated with 5 Mrad of electron beams with an electron ray irradiation device IR-2 (a product of Nisshin High Voltage Co., Ltd.) to effect crosslinking. The crosslinked sheet thus obtained was heated to 220° to 225° C. on a salt bath to effect foaming. The physical properties of the obtained foam were examined to obtain the results shown in Table 1.

It will be apparent from Table 1 that the flexibility and thermal resistance of the foams obtained in comparative Examples 1 and 4 in which the proportion of the resin component B in the copolymer was not within the range of the present invention were inferior to those of the foams obtained in Examples 1 to 5 in which the conditions of the present invention were satisfied. When the resin composition was outside the range of the present invention, the resulting product had an insufficient thermal resistance, though it was flexible, as in Comparative Example 2 or no intended foam could be obtained because the blowing agent was decomposed and large bubbles were formed in a large amount in the sheet-forming step as in Comparative Example 3.

TABLE 1

| | Amount of resin component A (parts by weight) | Resin component B | | | Amount of resin component C (parts by weight) | Physical properties of foam | | | |
|---|---|---|---|---|---|---|---|---|---|
| | | comonomer content (wt. %) | Tm (°C.) | Amount (parts by weight) | | Expansion ratio | R | N | Coefficient of heat shrinkage |
| Example 1 | 30 | EEA · 15 | 98 | 20 | 50 | 18.9 | 16.2 | 7.0 | 2.5 |
| 2 | 40 | " | 98 | 40 | 20 | 25.1 | 10.8 | 7.5 | 3.0 |
| 3 | 60 | EEA · 20 | 92 | 30 | 10 | 20.0 | 16.2 | 7.4 | 2.0 |
| 4 | 40 | EAA · 5 | 96 | 40 | 20 | 22.2 | 31.9 | 7.1 | 1.7 |
| 5 | 30 | EMMA MAH · 5 | 97 | 60 | 10 | 19.2 | 16.1 | 6.5 | 2.3 |
| Comp. Ex. 1 | 30 | EEA · 5 | 107 | 20 | 50 | 25.3 | 48.4 | 10.6 | 2.8 |
| 2 | 15 | EEA · 15 | 98 | 85 | 0 | 16.5 | 0.09 | 8.5 | 4.0 |
| 3 | 75 | " | 98 | 25 | 0 | — | — | — | — |
| 4 | 30 | EAA · 5 | 78 | 40 | 30 | 20.6 | 7.8 | 8.4 | 4.3 |

EXAMPLES 6 TO 8 AND COMPARATIVE EXAMPLES 5 AND 6

A resin composition shown in Table 2 was placed in an extruder having a bore diameter of 40 mm kept at 170° C. and extruded into a sheet having a thickness of 1.6 mm and a width of 250 mm. The sheet was irradiated with 3 Mrad of electron beams in air to effect crosslinking and then heated to 220° C. on a silicone bath to effect foaming. The physical properties of the foams thus obtained are shown in Table 2.

TABLE 2

|  | Example |  |  | Comp. Ex. |  |
|---|---|---|---|---|---|
|  | 6 | 7 | 8 | 5 | 6 |
| Resin composition |  |  |  |  |  |
| A. Polyvinyl chloride | 40 | 0 | 0 | 0 | 0 |
| Vinyl chloride/acrylic acid copolymer | 0 | 40 | 40 | 10 | 30 |
| B. EEA | 40 | 40 | 40 | 40 | 0 |
| C. Ethylene/propylene copolymer | 20 | 20 | 20 | 50 | 70 |
| Additives |  |  |  |  |  |
| Trimethylpropane triacrylate | 2 | 2 | 2 | 0 | 0 |
| Azodicarbonamide | 12 | 12 | 12 | 12 | 12 |
| Dicumyl peroxide | 0 | 0 | 1.5 | 0 | 0 |
| Basic lead sulfite | 1.5 | 1.5 | 1.5 | 2 | 2 |
| Ca/Zn complex stabilizer | 1.5 | 1.5 | 1.5 | 0 | 0 |
| Divinylbenzene | 3 | 3 | 5 | 3 | 0 |
| Physical properties |  |  |  |  |  |
| Expansion ratio | 25 | 25 | 25 | 28 | 4 |
| Gel fraction | 35 | 30 | 25 | 30 | 6 |
| Vacuum formability | 0.55 | 0.6 | 0.65 | 0.45 | 0.4 |
| Coefficient of heat shrinkage | o | o | o | o | o |
| Compression permanent set | 6.8 | 6.7 | 7.4 | 10.9 | 8.4 |
| R | 14.8 | 12.9 | 10.8 | 0.9 | 0 |
| Flexibility index | 13 | 15 | 15 | 12 | 33 |
| High-frequency sealability | o | o | o | x | x |

EXAMPLES 9 TO 12 AND COMPARAIVE EXAMPLES 7 AND 8

A resin composition shown in Table 3 was placed in an extruder having a bore diameter of 60 mm kept at 130° C. and extruded into a sheet having a thickness of 2.0 mm and a width of 350 mm. The sheet was irradiated with 5 Mrad of electron beams in air to effect crosslinking and then heated to 220° C. in a hot air furnace for 3 min to effect foaming. The physical properties of the foams thus obtained are shown in Table 3.

TABLE 3

|  | Example |  |  |  | Comp. Ex. |  |
|---|---|---|---|---|---|---|
|  | 9 | 10 | 11 | 12 | 7 | 8 |
| Resin composition |  |  |  |  |  |  |
| A. Polyvinyl chloride | 50 | 0 | 0 | 0 | 30 | 0 |
| Vinyl chloride/acrylic acid copolymer | 0 | 50 | 0 | 50 | 0 | 30 |
| Acrylic rubber/vinyl chloride graft copolymer | 0 | 0 | 50 | 0 | 0 | 0 |
| B. EEA | 30 | 30 | 30 | 30 | 0 | 70 |
| C. Low-density polyethylene | 20 | 20 | 20 | 20 | 70 | 0 |
| Additives |  |  |  |  |  |  |
| Dioctyl phthalate | 0 | 0 | 2 | 0 | 20 | 0 |
| Azodicarbonamide | 10 | 10 | 10 | 10 | 10 | 10 |
| Dicumyl peroxide | 0 | 0 | 0 | 2 | 0 | 0 |
| Basic lead sulfite | 1.5 | 1.5 | 1.5 | 0 | 1.5 | 1.5 |
| Ca/Zn complex stabilizer | 1.5 | 1.5 | 1.5 | 0 | 1.5 | 0 |
| Physical properties |  |  |  |  |  |  |
| Expansion ratio | 20 | 20 | 18 | 25 | 8 | 20 |
| Gel fraction | 30 | 38 | 35 | 25 | 65 | 19 |
| Vacuum formability | 0.55 | 0.50 | 0.60 | 0.65 | 0.2 | 0.5 |
| Coefficient of heat shrinkage | o | o | o | o | o | x |
| Compression permanent set | 7.2 | 8.6 | 9.4 | 6.8 | 12.3 | 6.9 |
| R | 16.8 | 17.6 | 18.8 | 21.4 | 0 | 44 |
| Flexibility index | 11.5 | 10 | 15.4 | 8.6 | 31 | 11.8 |
| High-frequency sealability | o | o | o | o | x | o |

We claim:

1. An expandable polyvinyl chloride resin composition comprising:
   (A) a polyvinyl chloride resin,
   (B) at least one copolymer selected from the group consisting of ethylene/acrylic acid copolymers, ethylene/alkyl acrylate copolymers and ethylene alkyl/methacrylate copolymers wherein the ethylene content is in the range of about 65 to 90% and the melting point of the copolymer is in the range of about 86° to 102° C.;
   (C) a polyolefin resin,
   in a weight ratio of (A+B)/C of at least about 1.0 and the integrated intensity ratio (R) in $^{13}$C-NMR spectru, $R = I_{56}I_{179}$, of the vinyl chloride component to the unsaturated carboxylic acid component is in the range of about 2.0 to 45, and
   said composition further comprising a blowing agent.

2. An expandable polyv chloride resin composition according to claim 1, wherein the amounts of the resin components A, B and C are 30 to 60 wt. %, 15 to 65 wt. % and 5 to 50 wt. %, respectively.

3. An expandable polyvinyl chloride resin composition according to claim 1, wherein the amounts of the resin components A, B and C are 40 to 50 wt. %, 20 to 40 wt. % and 10 to 30 wt. %, respectively.

4. An expandable polyvinyl chloride resin composition according to claim 1, wherein the resin component B is an ethylene/alkyl acrylate copolymer comprising 10 to 35 wt. % of an alkyl acrylate as the comonomer and having a melt flow rate of 1 to 50 g/10 min.

5. An expandable polyvinyl chloride resin composition according to claim 1, wherein the resin component B is an ethylene/acrylic acid copolymer comprising 10 to 35 wt. % of acrylic acid as the comonomer and having a melt flow rate of 1 to 50 g/10 min.

6. An expandable polyvinyl chloride resin composition according to claim 1, wherein the resin component C is polyethylene or polypropylene.

7. An expandable polyvinyl chloride resin composition according to claim 6, wherein the polyethylene is a low-density polyethylene having a melting point of lower than 115° C. and a density of up to 0.935 g/cm$^3$.

8. An expandable polyvinyl chloride resin composition according to claim 6, wherein the polypropylene is a propylene/ethylene random copolymer comprising 2 to 8 wt. % of ethylene and having a melt flow rate of 0.5 to 10 g/10 min and a ratio of absorbance at a wavelength of 730 cm$^{-1}$ or 720 cm$^{-1}$ to that at a wavelength of 840 cm$^{-1}$ of 0.02 to 0.3.

* * * * *